United States Patent
Windeler et al.

(10) Patent No.: US 7,457,500 B2
(45) Date of Patent: Nov. 25, 2008

(54) LARGE-MODE-AREA, MULTIMODE, HYBRID OPTICAL FIBERS AND DEVICES USING SAME

(75) Inventors: Robert Scott Windeler, Clinton Township, NJ (US); Andrew Douglas Yablon, Livingston, NJ (US)

(73) Assignee: Furakawa Electric North America, Inc., Norcross, GA (US)

( * ) Notice: Subject to any disclaimer, the term of this patent is extended or adjusted under 35 U.S.C. 154(b) by 0 days.

(21) Appl. No.: 11/809,973

(22) Filed: Jun. 4, 2007

(65) Prior Publication Data
US 2008/0131065 A1   Jun. 5, 2008

Related U.S. Application Data

(63) Continuation-in-part of application No. 11/633,999, filed on Dec. 5, 2006.

(60) Provisional application No. 60/750,967, filed on Dec. 16, 2005.

(51) Int. Cl.
G02B 6/02 (2006.01)
(52) U.S. Cl. .................. 385/123; 385/124; 385/125; 385/126; 385/127; 385/128
(58) Field of Classification Search .................. 385/123
See application file for complete search history.

(56) References Cited

U.S. PATENT DOCUMENTS

| | | | |
|---|---|---|---|
| 4,290,667 A * | 9/1981 | Chown | 385/33 |
| 5,074,633 A | 12/1991 | Cohen et al. | 385/43 |
| 5,422,897 A * | 6/1995 | Wyatt et al. | 372/6 |
| 6,104,852 A * | 8/2000 | Kashyap | 385/123 |

(Continued)

FOREIGN PATENT DOCUMENTS

EP   1245973   10/2002

(Continued)

OTHER PUBLICATIONS

C. Healdey et al, High-pulse energy MOPA using all-fiber components, Proceedings of the SPIE, SPIE, Bellingham, VA, US vol. 5709, Jan. 24, 2005; pp. 343-353.

(Continued)

*Primary Examiner*—Frank G Font
*Assistant Examiner*—Eric Wong
(74) *Attorney, Agent, or Firm*—Michael J. Urbano

(57) ABSTRACT

A large mode area optical fiber is configured to support multiple transverse modes of signal radiation within its core region. The fiber is a hybrid design that includes at least two axial segments having different characteristics. In a first axial segment the transverse refractive index profile inside the core is not radially uniform being characterized by a radial dip in refractive index. The first segment supports more than one transverse mode. In a second axial segment the transverse refractive index profile inside the core is more uniform than that of the first segment. The two segments are adiabatically coupled to one another. Illustratively, the second segment is a terminal portion of the fiber which facilitates coupling to other components. In one embodiment, in the first segment $M_1^2 > 1.0$, and in the second segment $M_2^2 << M_1^2$. In a preferred embodiment, $M_1^2 >> 1.0$ and $M_2^2 \sim 1.0$. In another embodiment, the optical fiber is coupled to a fiber stub.

34 Claims, 4 Drawing Sheets

U.S. PATENT DOCUMENTS

| | | | |
|---|---|---|---|
| 6,498,887 | B1* | 12/2002 | Gruner-Nielsen et al. ... 385/123 |
| 6,563,995 | B2* | 5/2003 | Keaton et al. ............ 385/127 |
| 6,909,538 | B2* | 6/2005 | Arbore et al. ............ 359/341.1 |
| 6,995,900 | B2* | 2/2006 | Keaton et al. ........... 359/341.1 |
| 2002/0168139 | A1 | 11/2002 | Clarkson et al. ............ 385/27 |
| 2004/0141228 | A1* | 7/2004 | Keaton et al. ........... 359/341.1 |
| 2004/0258341 | A1* | 12/2004 | Paolucci et al. ............... 385/4 |
| 2005/0063653 | A1 | 3/2005 | Matthijse et al. ............ 385/123 |

FOREIGN PATENT DOCUMENTS

EP       1811616  A2       7/2007

OTHER PUBLICATIONS

Guillaume Canat et al, Performance and limitations of high brightness Er+3-Yb3+ fiber sources; Comptes Rendus—Physique, Elsevier, Paris, FR—vol. 7, No. 2, Mar. 2006; pp. 177-186.

Bise R T et al, Low-Loss High-Strength Microstructured Fiber Fusion Splices Using GRIN Fiber Lenses; IEEE Photonics Technology Letters, IEEE, Service Center, Piscataway, NJ, US; vol. 17 No. 1, Jan. 2005; pp. 118-120.

A. D. Yablon, "Optical Fiber Fusion Splicing," Springer, New York (2005).

R. M. Wood, "Laser-Induced Damage of Optical Materials," Institute of Physics Publishing, Bristol & Philadelphia (2003).

IDS of co-pending parent U.S. Appl. No. 11/633,999, filed Dec. 5, 2006.

P-A. Belanger, "Beam quality factor of $LP_{01}$ mode of the step-index fiber," *Optical Engr.*, vol. 32, No. 9, pp. 2107-2109 (Sep. 1993).

J. W. Dawson et al., "Large flattened mode optical fiber for reduction of non-linear effects in optical fiber lasers" *Proc. SPIE*, vol. 5335, pp. 132-139 (2004).

J. W. Dawson et al, "Large flattened mode optical fiber for high output energy pulsed fiber lasers," *Proc. CLEO*, Paper CWD5, pp. 1169-1170 (Jun. 2003).

A. K. Ghatak et al., "Design of Waveguide Refractive Index Profile to Obtain Flat Modal Field," *Proc. SPIE*, vol. 3666, pp. 40-44 (Apr. 1999).

H. L. Offerhaus et al., "High energy single-transverse-mode Q-switched fiber laser based on a multimode large-mode-area erbium doped fiber," *Opt. Lett.*, vol. 23, No. 21, pp. 1683-1685 (Nov. 1998).

J. Nilsson et al., "Yb+3-ring-doped fiber for high-energy pulse amplification," *Opt. Lett.*, vol. 22, No. 14, pp. 1092-1094 (Jul. 1997).

H. Y. Tam, "Simple Fusion Splicing Technique for Reducing Splicing Loss Between Standard Singlemode Fibres and Erbium-Doped Fibre," *Electr. Lett.*, vol. 27, No. 17, pp. 1597-1599 (Aug. 1991).

* cited by examiner

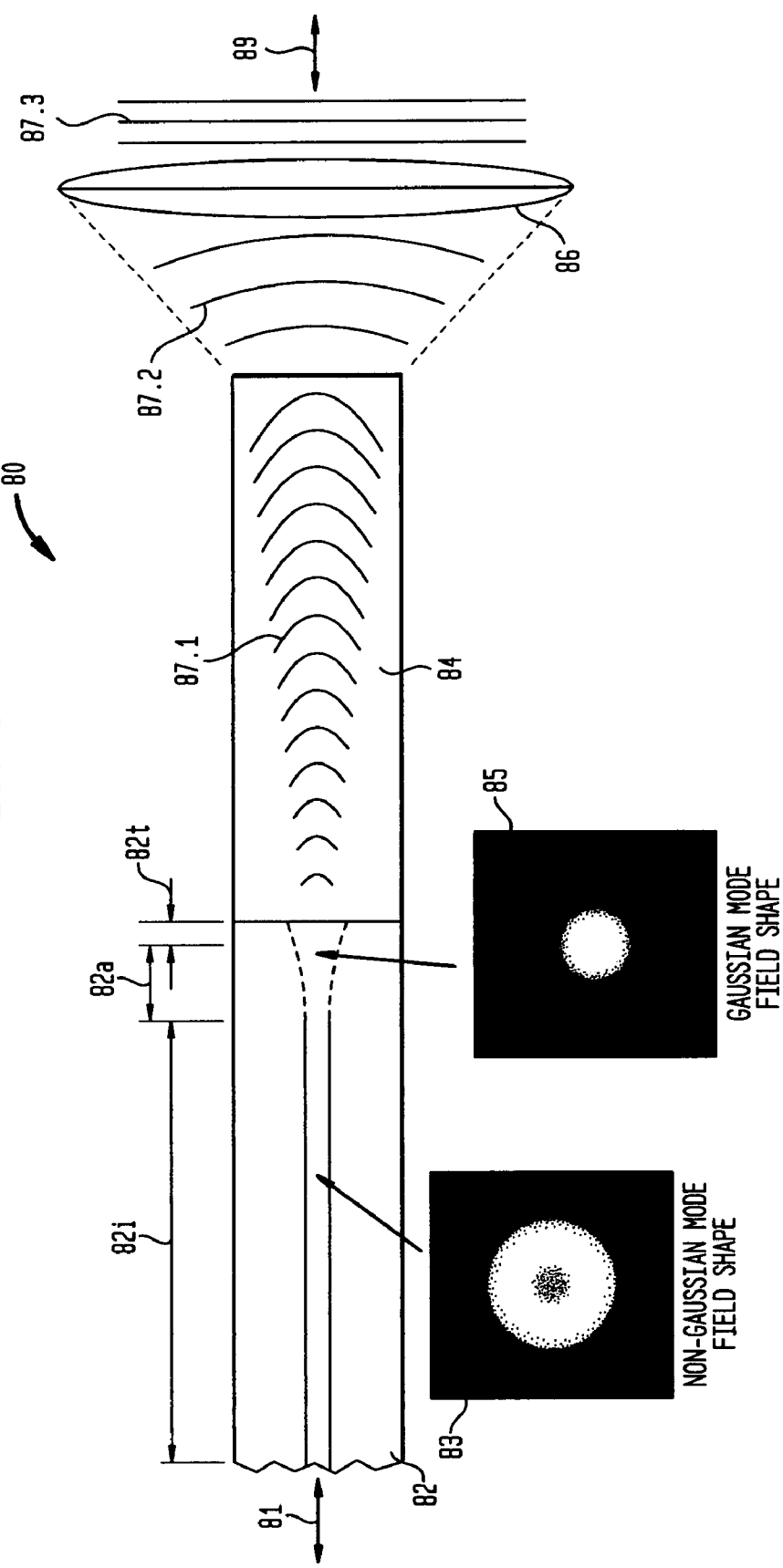

LARGE-MODE-AREA, MULTIMODE, HYBRID OPTICAL FIBERS AND DEVICES USING SAME

CROSS-REFERENCE TO RELATED APPLICATIONS

This application is a continuation-in-part of copending application Ser. No. 11/633,999 filed on Dec. 5, 2006 and entitled "Gain-Producing, Large Mode Area, Multimode, Hybrid Optical Fibers and Devices Using Same."

This application also claims priority from provisional application Ser. No. 60/750,967 filed on Dec. 16, 2005 and entitled "Rare-Earth-Doped, Large-Mode-Area, Multimode, Hybrid Optical Fibers and Devices Using Same."

BACKGROUND OF THE INVENTION

1. Field of the Invention

This invention relates to optical fibers and, more particularly, to large-mode-area, multimode optical fibers for high power optical amplifier or laser applications and improved coupling efficiency.

2. Discussion of the Related Art

Because of their high performance and cost effectiveness, rare-earth-doped fiber amplifiers (REDFAs), especially erbium-doped fiber amplifiers (EDFAs), are widely used in silica fiber-optic communication systems such as, for example, long-haul transport and CATV applications. Innovative design and optimization of rare-earth-doped fibers (REDFs), especially erbium-doped fibers (EDFs), have both played a critical role in these applications. In particular, designs that confine the optical mode field and control the erbium distribution enable efficient, low-noise amplification of light at low and medium optical power levels. On the other hand, for high power applications large-mode-area (LMA) fiber lowers the signal intensity, thereby reducing deleterious nonlinear effects, and also increases the pump absorption efficiency. High power REDFAs and rare-earth doped fiber lasers (REDFLs), especially those utilizing ytterbium-doped fibers (YDFs), also have many applications outside the traditional telecommunications industry. For example, high power, LMA, YDFs are used in welding and cutting, laser ranging and target designation, medical applications and pollution detection, and free space communications (e.g., between satellites).

The optical characteristics of a LMA fiber sensitively depend upon the details of its transverse refractive index profile. Conventional wisdom dictates that desirable LMA fibers have a fundamental mode with $M^2$ very near to 1.0, meaning that the optical field of the fundamental transverse mode is very nearly Gaussian in shape because the transverse refractive index profile inside the core is essentially uniform; that is, the refractive index profile is essentially uniform within the transverse cross-section of the core. $M^2$ measures the similarity between the mode field and a true Gaussian function. More specifically, $M^2=1.0$ for a mode having a Gaussian shape, and $M^2>1.0$ for all other mode field shapes. An $M^2$ very near to 1.0 facilitates low loss optical coupling, and furthermore the beam emerging from the fiber may be efficiently collimated or tightly focused to a diffraction limited spot. However, fabricating an LMA fiber with an ideal fundamental mode ($M^2=1.0$) and a uniform core refractive index profile can be difficult due to the tendency of the profile to exhibit a dip in refractive index near the longitudinal axis (also known as a center dip or burnoff). Moreover, LMA fibers with a fundamental transverse mode $M^2$ very near to 1.0 exhibit smaller effective areas and hence lower thresholds for undesirable optical nonlinearities than the fundamental transverse modes of fibers with similar core diameters but pronounced center dips. Finally, when a LMA EDF's core transverse refractive index profile is essentially uniform and the fundamental mode's $M^2$ is very near to 1.0, there is relatively little overlap between the fundamental mode and the outer region of the doped core. As a result, the fundamental mode may experience low amplification efficiency while high-order modes may experience undesirable amplification.

Although the foregoing discussion focuses on LMA REDFs, in many respects it is equally applicable to (i) LMA fibers doped with other gain-producing species, such as chromium and (ii) to LMA fibers that are not doped with any gain-producing species. In the latter case, for example, the LMA fiber might comprise the pigtail of a gain-producing fiber (GPF) or other device, or it might simply be a fiber segment coupling the stages of a multistage optical amplifier.

Thus, a need remains in the art for a LMA fiber with improved optical coupling efficiency.

There is also a need for such a LMA fiber that is suitable for high power optical fiber amplifier and laser applications.

BRIEF SUMMARY OF THE INVENTION

In accordance with one aspect of our invention, a LMA optical fiber is configured to support multiple transverse modes of signal radiation within its core region. Our fiber is a hybrid design that includes at least two axial segments having significantly different characteristics. In a first axial segment the transverse refractive index profile inside the core is not radially uniform, being characterized by a radial dip in refractive index. The first segment supports more than one transverse mode. In a second axial segment the transverse refractive index profile inside the core is more uniform than that of the first segment. The two segments are adiabatically coupled to one another. In one embodiment, the two segments are adiabatically coupled to one another by a third segment, which need not be (but may be) a gain-producing fiber. Illustratively, the second segment is a terminal portion of the fiber which facilitates coupling to other components.

In another embodiment of our invention, in the first segment $M_1^2 > 1.0$, and in the second segment $M_2^2 \ll M_1^2$. In a preferred embodiment, $M_1^2 \gg 1.0$ and $M_2^2 \sim 1.0$.

In yet another embodiment, the LMA fiber is coupled to a fiber stub.

BRIEF DESCRIPTION OF THE SEVERAL VIEWS OF THE DRAWING

Our invention, together with its various features and advantages, can be readily understood from the following more detailed description taken in conjunction with the accompanying drawing, in which:

FIG. 8 is a schematic cross-sectional view of a LMA hybrid fiber coupled to a fiber stub, in accordance with one more embodiment of our invention.

DETAILED DESCRIPTION OF THE INVENTION

General Optical Fiber Amplifier Structure

Figure 1:
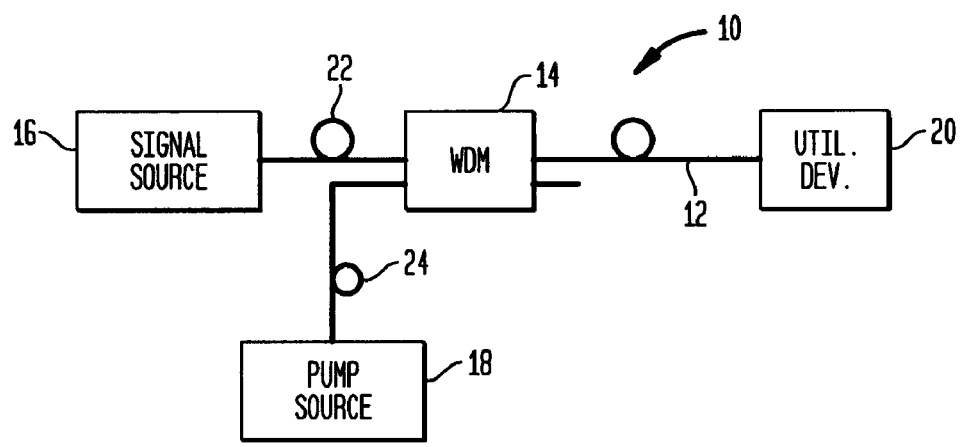
FIG. 1 is a schematic block diagram of a prior art REDFA.

A typical optical fiber amplifier 10, as shown in FIG. 1, comprises an GPF 12, which optically couples a coupling device 14 and a utilization device 20. In telecommunication applications device 14 is known as a wavelength division multiplexer; in high power non-telecommunications applications it is known as a pump-combiner. For simplicity, hereinafter we will describe our invention in the context of high power non-telecommunications applications. In this case, the pump-combiner 14 couples the outputs of an optical input signal source 16 and an optical pump source 18 into the GPF 12. The input signal source 16 generates a first-wavelength optical input signal, which is coupled to an input of a pump combiner 14 via a conventional fiber 22, whereas the pump source 18 generates a second-wavelength optical pump signal, which is coupled by a conventional fiber 24 to another input of pump combiner 14.

As is well known in the art, the pump signal generates a population inversion in the GPF 12, which amplifies the input signal from input source 16. The amplified input signal propagates along GPF 12 to utilization device 20. In high power applications the latter may include a myriad of well known devices or apparatuses; e.g., another optical amplifier, a beam collimator, a lens system, a work piece (e.g., for cutting or welding); whereas in telecommunications applications, utilization device 20 may include an optical receiver, an optical modulator, an optical coupler or splitter, or a piece of terminal equipment. Some of these may be coupled to the GPF 12 via a standard pigtail connector (not shown).

Illustratively, the input source 16 is a laser that generates a relatively low power optical input signal at wavelength in the amplification range of the gain-producing species of GPF 12, whereas the pump source 18 is a semiconductor light emitting diode (LED) or an array of LEDs that generates a relatively high optical power (e.g., above about 150 mW) pump signal at a shorter center wavelength that produces the desired amplification of the input signal. Preferably, the GPF 12 is a ytterbium-doped fiber, the signal source 16 generates an input signal having a center wavelength of about 1080 nm, and the pump source 18 generates a pump signal at a center wavelength of about 915 nm, or alternatively at about 975 nm. We note here that a semiconductor laser may also be used as a pump source, but an LED, especially an array of LEDs, is preferred because more total light can be coupled into the fiber with an LED.

Although the optical amplifier of FIG. 1 depicts a common co-propagating pump configuration (i.e., the pump and input signals propagate in the same direction through the GPF), it is also possible to use a counter-propagating configuration (i.e., the pump and input signals propagate in opposite directions through the GPF). In addition, a multiplicity of optical amplifiers may be arranged in tandem, a scheme that is well known in the art for increasing the total gain of a high power multi-stage system. Pump energy may also be transversely coupled into the GPF.

In addition, when provided with a suitable, well-known optical resonator (e.g., a pair of spaced apart fiber gratings) the GPF-resonator combination may function as a laser.

Hybrid LMA Fiber Design

Figure 4A:
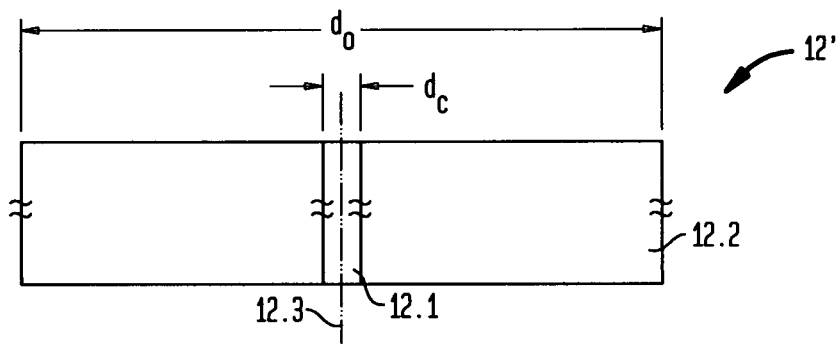
FIG. 4A is a schematic cross-sectional view of a LMA optical fiber taken through its axis of propagation.

In accordance with one aspect of our invention, as shown in FIG. 4A, LMA GPF 12' includes a core region 12.1 of diameter $d_c$ surrounded by a cladding region 12.2 of diameter $d_o$. We define the phrase large mode area (LMA) as follows: the core and cladding regions of a LMA fiber are configured to produce an effective mode area substantially larger then that of a conventional single mode fiber. For example, at a wavelength of about 1080 nm a conventional single mode fiber illustratively has a mode area of about 50 $\mu m^2$, but at the same wavelength a LMA fiber might have a mode area of about 100 $\mu m^2$. Similarly, at a wavelength of about 1550 nm a conventional single mode fiber illustratively has a mode area of about 80 $\mu m^2$, but at the same wavelength a LMA fiber might have a mode area of about 160 $\mu m^2$. Although these illustrations indicate that a LMA fiber has mode area twice as large as a single mode fiber at the same wavelength, other ratios may also be suitable depending the particular application of the LMA GPF and the performance desired.

The refractive index of the core region 12.1 is higher than that of the cladding region 12.2, with the difference in index being designated $\Delta n$. Although not shown, it is well known that the cladding may include an inner (depressed) cladding region and an outer cladding region, with the refractive index of the outer cladding region being between that of the core and the inner cladding region.

Figure 2:
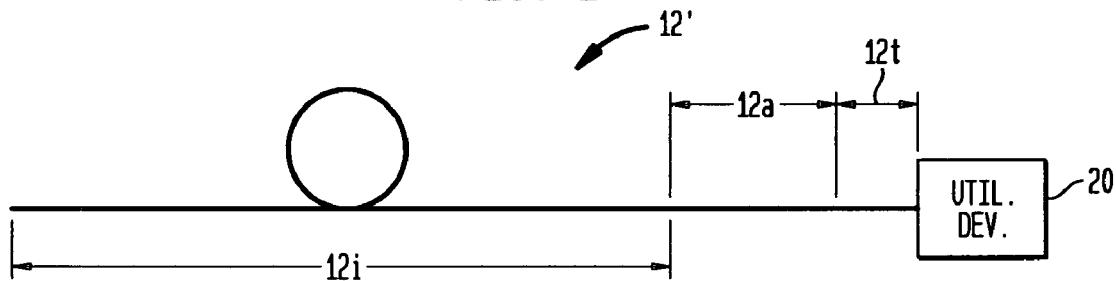
FIG. 2 is a schematic of a LMA optical fiber 12' showing an input segment 12i, an adiabatic coupling segment 12a, and a low $M^2$ terminal segment 12t, in accordance with one embodiment of our invention.

In either case, the core and cladding regions are configured to support the propagation of multiple transverse modes of input signal radiation propagating therein from source 16 (FIG. 1). In accordance with one aspect of our invention, the GPF 12' is a hybrid fiber, as shown in FIG. 2, in that it includes at least two axial segments that have different characteristics; namely, a LMA axial input segment 12$i$ and a LMA axial terminal segment 12$t$ adiabatically coupled to one another, for example, by means of a LMA axial adiabatic segment 12$a$. In addition, the hybrid fiber 12' may include a LMA terminal segment at its input end (not shown), at its output end (as shown in FIG. 2), or both.

Figure 4B:
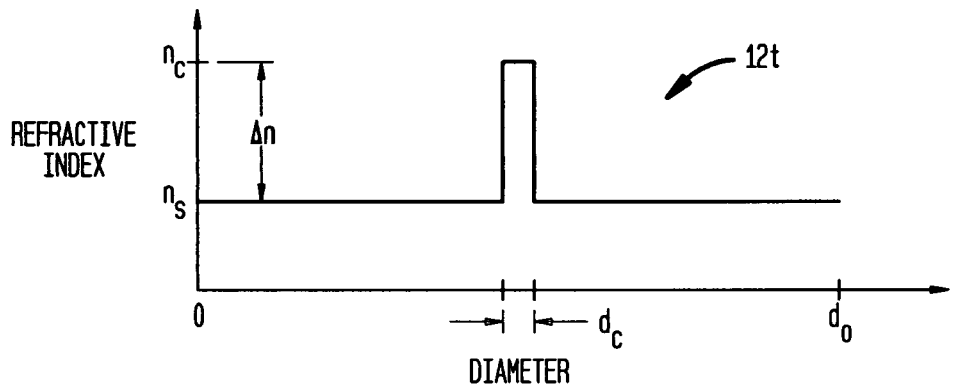
FIG. 4B is a schematic transverse refractive index profile of a terminal segment of the LMA optical fiber shown in FIG. 4A, in accordance with yet another embodiment of our invention.
Figure 4D:
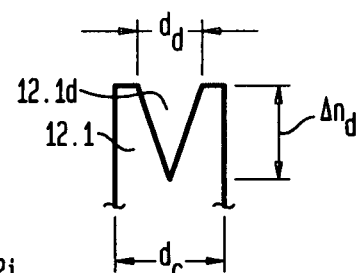
FIG. 4D is an expanded view of the pronounced dip in the schematic refractive index profile of the core region of FIG. 4C.
Figure 4C:
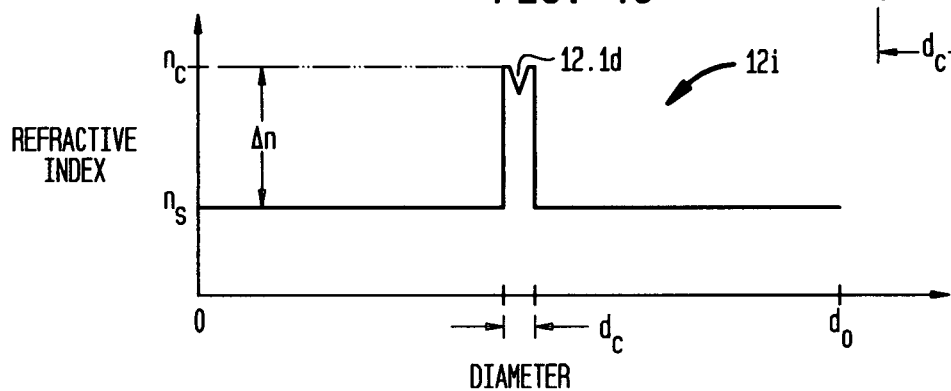
FIG. 4C is a schematic transverse refractive index profile of an input segment of the LMA optical fiber shown in FIG. 4A, showing a pronounced dip in the profile at or near the center of the core region, in accordance with still another embodiment of our invention.

More specifically, in one sense the terminal and input segments have different characteristics in that they have different transverse refractive index profiles, as shown in FIGS. 4B and 4C, respectively. In general the transverse refractive index profile inside the core region of the terminal segment 12*t* is more uniform than that of the input segment 12*i*. The degree of uniformity is measured by the high frequency content of, for example, the Fourier transform of the profile shape. Thus, a profile whose Fourier transform contains fewer high frequency components is considered to be more uniform than a profile whose Fourier transform contains more high frequency components. Visual observation of the relative uniformity of simple profiles is often consistent with this type of quantitative analysis; for example, FIG. 4B shows that the profile inside the core region of the terminal segment 12*t* exhibits an essentially constant transverse refractive index, and therefore has fewer high frequency components in its Fourier transform, whereas FIG. 4C shows that the profile inside the core region of the input segment 12*i* exhibits a pronounced central dip in transverse refractive index, and therefore has more high frequency components in its Fourier transform. Thus, as shown in FIG. 4C, in the input segment 12*i* the transverse refractive index profile of the core region 12.1 is not radially uniform; that is, the index profile exhibits a pronounced dip 12.1*d* where the transverse index at or near the center of the core region 12.1 decreases by an amount $\Delta n_d$, as shown in FIG. 4D. In contrast, in the terminal segment 12*t* the transverse refractive index profile inside the core region is more nearly uniform (or radially constant), as shown in FIG. 4B.

In addition, the input segment 12*i* is configured to support more than one transverse mode.

In designing the features of the pronounced transverse refractive index dip 12.1*d* we prefer that the magnitude of $\Delta n_d$ of the dip should be no greater than about 100% of $\Delta n$, the core-to-cladding index difference. The size of $\Delta n$ depends on the gain-producing dopant of the GPF as well as any index-altering dopants such as Ge, P, Al or F that might be added to the core and/or cladding regions; e.g., in Yb-doped fibers $\Delta n \sim 0.005$, whereas in Er:Yb doped fibers $\Delta n \sim 0.01$. At the opposite extreme, the magnitude of the dip should not be smaller than about 5% of $\Delta n$. The lower end of the range is dictated primarily by the need to perturb sufficiently the transverse mode shape from pure Gaussian, as discussed below. On the other hand, the width or diameter $d_d$ of the dip should be larger than approximately the smallest wavelength of light used in the system (e.g., larger than the pump wavelength, which is typically shorter than the signal wavelength). At the opposite extreme, the maximum width $d_d$ of the dip may be equal to the diameter $d_c$ of the core region 12.1, but typically is about $d_c/3$. The object of these conditions is that the light "see" the perturbation in refractive index produced by the dip. In addition, although the dip is depicted as being conical, other geometric shapes (e.g., cylindrical) as well as more complex shapes, may also be suitable.

In another sense, the terminal and input segments have different characteristics in that their $M^2$ parameters are different from one another, where $M^2$ defines the similarity that the fundamental transverse mode of the fiber has to an ideal Gaussian function, as described by P. A. Belanger, *Optical Engineering*, Vol. 32. No. 9, pp. 2107-2109 (1993), which is incorporated herein by reference. (Although this paper defines $M^2$ for $LP_{01}$ fundamental mode of a step-index optical fiber, the definition is valid for all optical fibers, including those with a center dip in the transverse refractive index profile of the type described herein.) In particular, the input segment 12*i* is characterized by a parameter $M_1^2$, the terminal segment 12*t* is characterized by a parameter $M_2^2$, and the following inequalities are satisfied: $M_1^2 > 1.0$ and $M_2^2 << M_1^2$. In a preferred embodiment, $M_1^2 >> 1.0$ and $M_2^2 \sim 1.0$. In theory $M^2$ may be arbitrarily large, but in practice $M^2$ for GPFs is typically in the range, $1 < M^2 < 10$, approximately. Moreover, $M^2 \sim 1.06$ is typically considered to be small in the sense of $M_2^2 \sim 1.0$, for example, whereas $M^2 \sim 1.3$ is considered to be large in the sense of $M_1^2 >> 1.0$, for example.

In addition, the input segment 12*i* and the terminal segment 12*t* are coupled to one another adiabatically; for example, by means of a LMA adiabatic segment 12*a*, as shown in FIG. 2. In general such couplers insure that energy propagating in a particular transverse mode in the input segment is not significantly coupled into other transverse modes in the terminal segment, and conversely. Adiabatic coupling techniques and designs, which are well known in the art, include physically tapering the core regions so that the diameter smoothly increases (or decreases) in an axial direction along the coupling region, or chemically graduating the concentration of dopants so that their density increases (or decreases) gradually in an axial direction along the coupling region. In the latter case, a preferred technique involves (i) heating the GPF (e.g., with a conventional torch) to cause dopants in the fiber to diffuse, and (ii) controllably changing the amount of heat applied to the fiber in accordance with the longitudinal position of the torch along the fiber, so that the desired distribution of dopants is achieved. See, for example, H. Y. Tam, *Elecir. Lett.*, Vol. 27, No. 17, pp. 1597-1599 (1991), which is incorporated herein by reference.

The combination of the design of the $M^2$ parameter of the segments and the use of an adiabatic transition between them improves the coupling of the fundamental transverse mode, and significantly decreases coupling to higher order transverse modes, from the input segment to the terminal segment.

Another advantage of our invention is that the foregoing principles can be applied even in the absence of a fusion splice (a typical prior art approach to coupling different single mode fibers), for example, when coupling between the terminal segment of an GPF and a bulk (non-fiber) optical element (e.g., a telescope) is achieved in free space with the use of a suitable lens or lens system.

In addition, prior art techniques for improving the performance of an interconnection between an optical fiber and bulk optical elements can be combined with the present invention. For example, it is known in the prior art that cleaving or polishing the facet at the termination of an optical fiber at a slight angle (typically 2° to 10°) to the axis of optical propagation can substantially reduce optical reflection from that facet.

In a typical silica-based GPF well known in the art for operation in the wavelength ranges discussed above, the core region 12.1 is doped with at least one gain-producing species [e.g., a rare earth element (e.g., Er, Yb, Th, Tm, Nd, and/or Pr) or chromium (Cr)] and one or more refractive-index-altering substances [e.g., Ge, P or Al (to increase the index) or F (to decrease the index)]. The cladding region 12.2 may be pure silica, or it may also be doped. Illustratively the doping levels are chosen so that the index step $\Delta n$ between the core and cladding ranges from about 0.005 to 0.01 depending on the dopants used, as discussed previously, and the index dip $\Delta n_d$ in the input segment is about the same size as $\Delta n$.

Moreover, for the fiber to support multiple transverse modes the core diameter $d_c$ is illustratively about 20 μm. The outer diameter $d_o$ of such fibers is typically in the approximate range of 125 μm to 600 μm. In addition, it is apparent that the input segment 12*i* is a major fraction of the total length of fiber 12', whereas the terminal segment 12*t* is a relatively smaller fraction; e.g., the terminal segment is illustratively less than about 500 μm long, whereas the input segment is illustratively on the order of 1 m or 1 km long.

Finally, those skilled in the art will readily appreciate that our hybrid design is applicable to LMA fibers in general; that is, LMA fibers that include gain-producing species (such as GPFs) as well as those that do not. More specifically, such LMA fibers might interconnect the stages of a multistage optical amplifier or they might comprise the pigtails of GPFs or other devices. In the case where rapidly diffusing rare-earth dopants are absent from the LMA fiber, the fiber should be doped with another species that diffuses sufficiently rapidly during heat treatment (discussed more fully hereinafter) to allow the formation of terminal segment 12t.

Fiber Termination Treatment

As mentioned above, an elevated $M^2$ LMA optical fiber can be locally heated to induce dopant diffusion that locally decreases the fiber's $M^2$. Heating a fiber to sufficient temperatures (for example, heating a silica fiber to near or above fusion splicing temperatures of about 2000° C.) induces substantial diffusion of the index-altering dopants, thereby inducing significant changes in the fiber's transverse refractive index profile. Such dopant diffusion is employed to suppress center dips, ridges, or other refractive index profile features that increase the $M^2$ of the fundamental $LP_{01}$ mode. In many (but not all) implementations of our invention, the MFD (mode field diameter using the conventional "Petermann II" definition) of the fundamental transverse $LP_{01}$ mode actually decreases following heat-induced diffusion.

Figure 5:
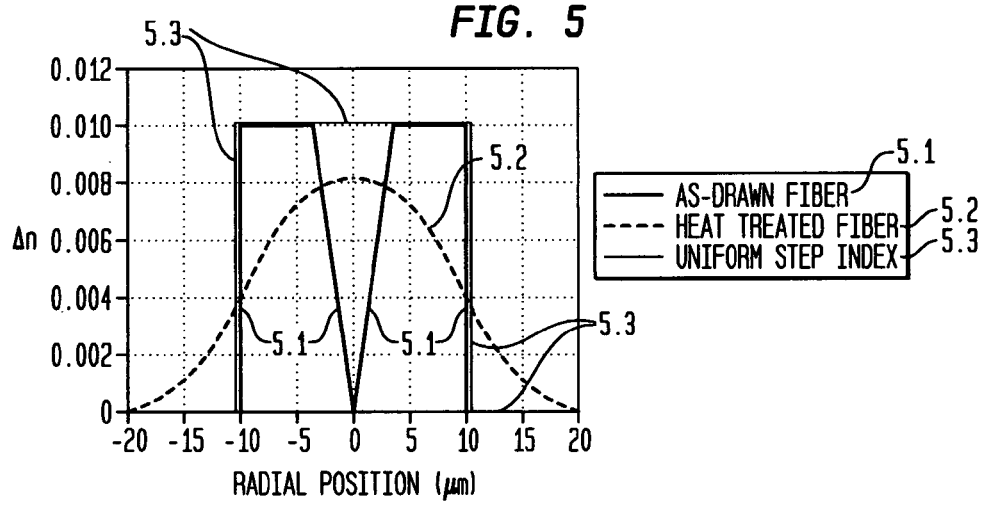
FIG. 5 is a graph of the core-cladding transverse refractive index step ($\Delta n$) versus radial position for an as-drawn fiber (Curve 5.1), a heat-treated fiber (Curve 5.2), and a uniform step index fiber (Curve 5.3)
Figure 6:
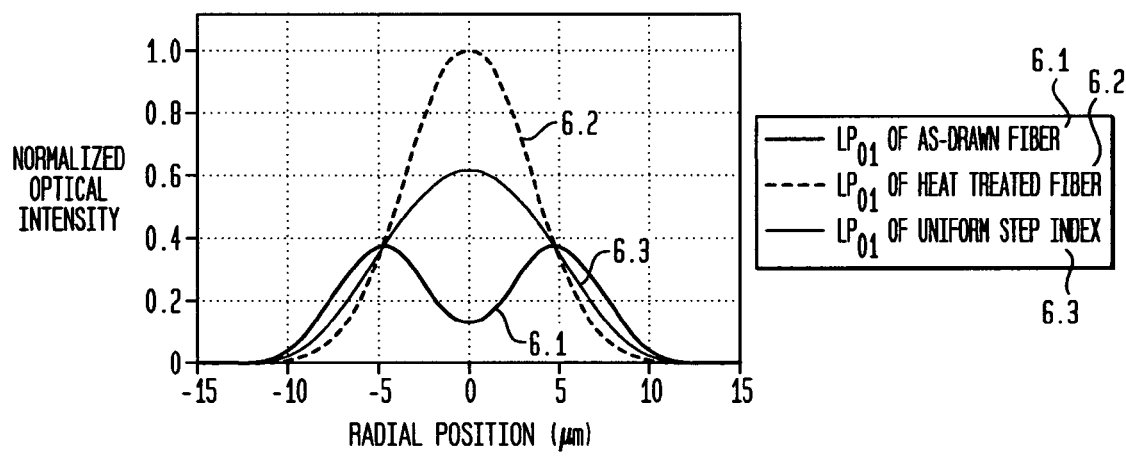
FIG. 6 is a graph of normalized optical intensity of the fundamental transverse mode ($LP_{01}$) for an as-drawn fiber (Curve 6.1), a heat-treated fiber (Curve 6.2), and a uniform step index fiber (Curve 6.3)

In our invention, the drawn LMA optical fiber is locally heated to a high temperature (>>1200° C. for a silica fiber) to induce dopant diffusion that suppresses the center-dip or other features in the refractive index profile that elevate the $M^2$ of the fiber's $LP_{01}$ fundamental mode. Curve 5.1 of FIG. 5 depicts a theoretical as-drawn fiber index profile for an Er:Yb doped fiber whose initial MFD is 13.4 µm and whose initial $M^2$~1.32. A profound center-dip is visible in this simulated refractive index profile. Heating such a silica fiber design to about 2100° C. for about 25 seconds modifies the refractive index profile (Curve 5.2) such that the final MFD is 13.3 µm and the initial $M^2$ is reduced (improved) to about 1.0. Applying this modification to the terminal segment 12t of fiber 12' (FIG. 2) significantly improve the coupling efficiency into or out of this fiber, regardless of the coupling technology used (conventional fusion splicing, connectorization, free-space coupling, GRIN fiber lenses, etc.). The corresponding transverse $LP_{01}$ mode field shapes (intensity fields) are depicted in FIG. 6.

For this particular example, it is important to note that for a given amount of power guided in the $LP_{01}$ fundamental mode, the peak optical intensity of the as-drawn fiber is only about 37% of the peak optical intensity occurring in the heat-treated fiber. Therefore, if an LMA optical fiber designed with the transverse refractive index profile depicted in FIG. 5 (Curve 5.1) is terminated at each end with a segment 12t locally heat treated to induce the diffused index profile depicted in FIG. 5 (Curve 5.2), the peak optical intensity experienced in the majority of the fiber will be relatively low so that the threshold for the onset of undesirable nonlinear optical effects (e.g., stimulated Brillouin scattering, or stimulated Raman scattering) will be relatively high. Meanwhile, the coupling efficiency will be excellent at the fiber termination points because $M^2$ in the terminal segment 12t approaches 1.0. The optical intensity is expected to be elevated only in the short (<about 500 µm) regions of heat-treated terminal segments of fiber. Since deleterious nonlinear optical effects scale with the peak intensity as well as the length of the fiber segment, elevated optical intensity can be tolerated over short terminal segments of fiber.

Fiber terminations can be heat treated using a conventional fusion splicer. If the fiber is cleaved or polished inside the heat-treated region, then free-space coupling (for example, with conventional bulk lenses) can be used to obtain efficient optical coupling to the $LP_{01}$ fundamental transverse mode of a fiber whose as-drawn $LP_{01}$ mode field shape is very non-Gaussian. Alternatively, heat treatment can be incorporated as part of a modified fusion splicing process. The predicted coupling loss between a Gaussian field matching the MFD of the as-drawn (unheated) fiber in FIG. 6 (Curve 6.1) is about 0.7 dB, whereas the corresponding predicted coupling loss is less than about 0.01 dB for the heat treated fiber (Curve 6.2). Moreover, over 10% of the Gaussian energy will be coupled into the undesirable $LP_{02}$ mode of the as-drawn fiber, whereas the amount of energy coupled into the $LP_{02}$ mode of the heat-treated fiber is unmeasureable.

In order to ensure that energy is not lost from the $LP_{01}$ fundamental mode in the transition region between the heat-treated and as-drawn regions of the LMA fiber, the transition should be made gradual and adiabatic, as discussed previously. The change in the refractive index profile in the transition region must be very gradual along its length. When producing the transition region by heat-induced dopant diffusion, a gradual transition can be achieved by varying the amount of heat applied to the transition region along its length, for example by choosing a broad (i.e., fanned out) heat source or scanning a more focused heat source along the transition region. How gradually this change must occur depends upon the details of the index profiles and the operating wavelength, according to principles well known in the art. Numerical simulations based on refractive index profiles as well as empirical process optimization can be readily employed to find suitable heating conditions for which the transition losses are minimized.

As noted above, the present invention can be implemented as a part of a modified fusion splicing process applied at or near the interface between an LMA fiber and another optical fiber. In this case, dopant diffusion in the direction transverse to the optical propagation axis modifies the refractive index profile of the terminal segment (e.g., 12t, FIG. 2) of the LMA fiber, thereby producing a more favorable $M^2$ in that terminal segment. It is also known that there will inevitably be a small amount of interdiffusion in the axial direction across the splice joint from the LMA fiber into the other fiber, and also from the other fiber into the LMA fiber. Such interdiffusion across the fusion splice joint is known to substantially reduce the reflectance of the fusion splice joint, which can be advantageous when assembling an optical fiber device that is sensitive to feedback from optical reflections, such as a high power fiber laser. [See, A. D. Yablon, "Optical Fiber Fusion Splicing," Springer, New York (2005), which is incorporated herein by reference.] Therefore the present invention can also offer the added benefit of reducing reflectance at a terminal fusion splice between the LMA fiber and another fiber.

It is also known in the art that at a given temperature different chemical dopant species will diffuse at different rates. Fiber dopants such as fluorine, aluminum, erbium, and ytterbium are known to diffuse more rapidly than germanium, and, therefore, these dopants are preferred when fabricating a LMA fiber subject to dopant diffusion in accordance with the above-described technique for implementing the present invention. Thus, the fiber could be a non-gain-producing LMA fiber doped with F or Al, or both, or it could be a gain-producing LMA fiber doped with Er or Yb, or both, and possibly also doped with F or Al, or both, depending on the particular application of the fiber.

Manufacturing limitations can also inadvertently introduce small azimuthal variations into an LMA fiber index profile. Such azimuthal non-uniformities have a negligible impact on the mode field shape of conventional non-LMA fibers, but in an LMA fiber, even a small (~0.0005) azimuthal nonuniformity in the refractive index profile can encourage the mode's optical intensity to cluster in the azimuthal sector of highest refractive index. When the intended fundamental mode is ring shaped, as in curve 6.1 of FIG. 6, such small azimuthal non-uniformities can produce a crescent-shaped, rather than a ring-shaped, intensity distribution. Generally, optical coupling between an azimuthally symmetric optical signal and the non-azimuthally symmetric mode is inefficient. The present invention can alleviate this problem since the terminal segment (e.g., 12t, FIG. 2) of a dopant-diffused fiber will have a substantially azimuthally symmetric mode field and an adiabatic transition segment (e.g., 12a, FIG. 2) between the non-azimuthally symmetric (undiffused) and azimuthally symmetric portions (diffused) of the fiber can be readily achieved.

Theory of Operation

When the fundamental transverse mode of a LMA fiber has an $M^2 > 1.0$, its coupling losses (free-space or fusion splice) are elevated, and the fundamental transverse mode input signal emerging from the fiber cannot be readily tightly focused down to a small spot size or readily collimated. However, there are certain advantages to having an elevated $M^2$ (>1.0). In particular, fibers whose fundamental transverse mode fields have larger values for $M^2$ typically exhibit larger effective mode areas and hence lower peak optical intensities than fibers with the same core diameters but lower $M^2$. Consequently, fibers with elevated $M^2$ exhibit higher thresholds for the onset of undesirable optical nonlinearities such as SBS (stimulated Brillouin scattering) and SRS (stimulated Raman scattering). In addition to this benefit, in the case of LMA GPFs, fibers with an elevated $M^2$ (for example, due to a pronounced center-dip in the core region refractive index, as shown in FIG. 4C for input fiber segment 12i) can exhibit superior overlap between the gain-producing dopants in the core region and the fundamental transverse mode field of the input signal propagating in the core region. Therefore, the amplification efficiency of the fundamental transverse mode can be increased and the amplification of undesirable higher order transverse modes can be decreased by designing a fiber with an elevated $M^2$.

These advantages are evident in FIGS. 5-6, which compare three LMA fibers: a theoretical as-drawn fiber having an elevated $M^2$ (curves 5.1, 6.1); a theoretical uniform step index fiber also having an elevated $M^2$ (Curves 5.3, 6.3); and a fiber heated-treated to reduce its $M^2$ (Curves 5.2, 6.2). Their refractive index profiles are compared in FIG. 5, and their corresponding fundamental $LP_{01}$ transverse mode optical intensity profiles at 1550 nm are compared in FIG. 6. The optical intensity in the as-drawn and step index fibers has been normalized to the peak intensity in the heat-treated portion of the fiber so that they both represent the same amount of optical power.

More specifically, the as-drawn fiber, which corresponds, for example, to the input fiber segment 12i of FIG. 2, exhibits a pronounced central dip (as quantified previously) in the core region transverse refractive index, and consequently an elevated fundamental mode $M^2$ of about 1.32 and a relatively large effective modal area of about 259 $\mu m^2$. Both the as-drawn fiber and the uniform step index fiber had $\Delta n \sim 0.01$ and $d_c \sim 20$ $\mu m$. However, the uniform step index fiber had a fundamental mode $M^2$ of about 1.05 and a reduced effective area of about 200 $\mu m^2$. FIG. 6 compares the normalized intensity distributions to the index profiles for these fibers in order to illustrate the superior overlap between the core region index profile and the intensity profile of the fiber with elevated $M^2$.

On the other hand, in the heat-treated fiber, which corresponds, for example, to the terminal fiber segment 12t of FIG. 2, the heat treatment has an improved (reduced) $M^2$ from 1.32 to about 1.0, reduced the effective modal area from 259 $\mu m^2$ to 139 $\mu m^2$, increased the peak optical intensity from about 0.37 to 1.0, and did not substantially alter the well-known "Petermann II" MFD (about 13.3 $\mu m$ for both the as-drawn and heat-treated fibers). The index profile and corresponding normalized intensity distribution for an ideal uniform step index profile is also shown (Curves 5.3, 6.3) for comparison.

Figure 7:
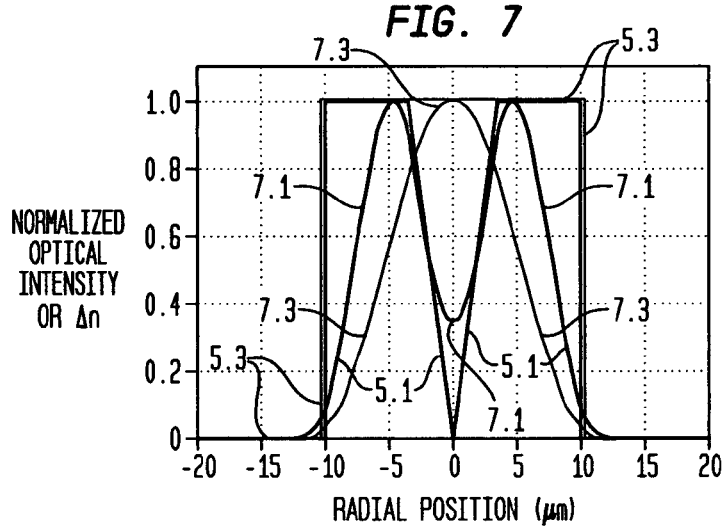
FIG. 7 is a graph of normalized optical intensity for a fiber with a pronounced center dip and for a uniform step index fiber versus radial position comparing the overlap between the fundamental transverse mode and the index profile of the as-drawn fiber (Curve 7.1) and the ideal uniform step index fiber (Curve 7.3) of the fiber designs of FIG. 5.

Finally, FIG. 7 compares of the overlap between the fundamental transverse mode and the refractive index profile of the as-drawn fiber (Curves 5.1, 7.1) and an ideal uniform step index fiber (Curves 5.3, 7.3) described above in conjunction with FIGS. 5-6. The index profiles and the optical intensities are individually normalized to themselves. FIG. 7 shows that a substantial portion of the outer core region of the step index fiber experiences a relatively low optical intensity, whereas a larger fraction of the as-drawn fiber experiences a higher optical intensity. Therefore, the as-drawn fiber has better overlap between the transverse mode field and the gain-producing dopants, which means that the as-drawn fiber also exhibits better amplification efficiency.

Alternative Embodiments

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

Figure 3:
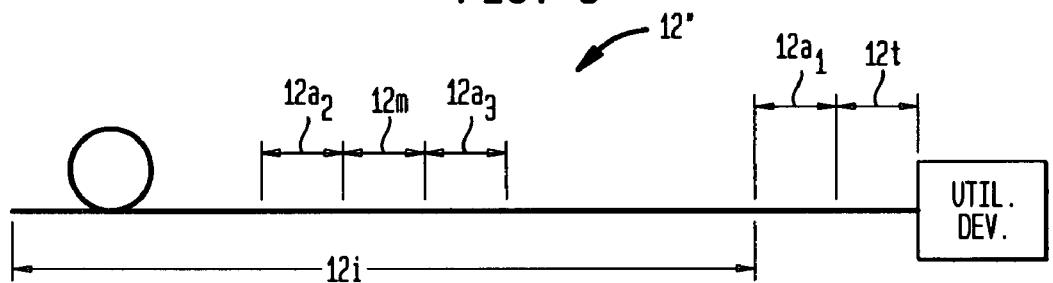
FIG. 3 is a schematic of a LMA optical fiber 12" showing, in addition, another low $M^2$ segment 12m disposed between a pair of adiabatic coupling segments $12a_2$ and $12a_3$, in accordance with another embodiment of our invention.

In particular, as shown in FIG. 3, a LMA optical fiber 12" may include a LMA intermediate segment 12m located at a position between the ends of the fiber in addition to the LMA terminal segment 12t, which is adiabatically coupled to input segment 12i by means of LMA adiabatic coupler $12a_1$. The intermediate segment 12m is also adiabatically coupled to input segment 12i, illustratively by means of LMA adiabatic couplers $12a_2$ and $12a_3$. Like the terminal segment 12t, the intermediate segment 12m has a fundamental transverse mode $M^2$ that is less than that of the input segment 12i and is preferably close to 1.0. One application of such an intermediate segment 12m is to filter out undesirable high order transverse modes.

In addition, although we have described our invention in the context of optical amplifier applications, those skilled in the art will readily recognize its application can be extended to any apparatus that requires coupling to a GPF (e.g., a fiber laser).

Moreover, the adiabatic coupling region, such as coupler 12a of FIG. 2, need not be a GPF. It may simply be a segment of fiber that is not doped with any gain-producing species but is provided with a center dip in its refractive index profile similar to that of fiber segment 12i. This segment would then be designed in well known fashion, as discussed previously, to provide an adiabatic transition between segments 12i and 12t. Indeed, as noted earlier, the entire fibers 12' and 12" of FIGS. 2 and 3 may be LMAs that contain no gain-producing species, depending on the particular application.

Finally, we illustrate in FIG. 8 an embodiment of our invention in which a hybrid LMA fiber is coupled to a utilization device through free space. More specifically, optical apparatus 80 includes a hybrid LMA fiber 82 coupled to a fiber stub 84, which in turn is coupled through free-space to a utilization device exemplified by a lens (or lens system) 86. The latter, of course, may couple the radiation (light) output of stub 84 to another utilization device (not shown). In this regard, fusion splicing is preferred over butt coupling.

As previously described with reference to FIG. 2, hybrid LMA fiber 82 includes,, an input segment 82i, an adiabatic segment 82a and a terminal segment 82t arranged in tandem with one another. As shown by the micrographs 83 and 85, the mode field within input segment 82i is non-Gaussian, whereas that within terminal segment 82t is essentially Gaussian.

In general, the refractive index of stub 84 is essentially uniform (i.e., constant) within (or over) any axial cross section. Although not necessary, but typically preferred, the refractive index of stub 84 may also be uniform from one axial cross section to another axial cross section. Illustratively, stub 84 comprises a core-less silica fiber having a typical length of ~500 µm.

In operation, the Gaussian mode (micrograph 85) generated in terminal segment 82t enters stub 84 where its wavefront 87.1 spatially expands by diffraction. When the mode emanates from the output end of stub 84, its wavefront 87.2 is essentially spherical and hence compatible with conventional bulk optics components, such as lens 86. The latter produces an essentially planar wavefront 87.3, which is coupled to a suitable utilization device (not shown).

The embodiment of FIG. 8 is reciprocal in that light may propagate in either direction through the various components, as indicated by the double-headed arrows 81 and 89. That is, light may be coupled into LMA fiber 82 and out of lens 86, or, conversely, it may be coupled into lens 86 and out of fiber 82.

Preferably, the fiber 82 and the stub 84 are coupled to one another in a fashion that militates against the formation of high intensity optical spots at the interface between them. (In this regard, fusion splicing is preferred over butt coupling.) It is known that the intrinsic threshold optical intensity for damage is much higher inside a continuous bulk material than at a free surface. Moreover, any free surface is a potential location for contamination that can serve as a nucleation site for optical damage. Therefore, the stub 84 ensures that the maximum optical intensity is attained only inside the bulk, for example at the interface between the fiber 82 and the stub 84, which is free of contaminants and where the intrinsic threshold for optical damage is highest. See, R. M. Wood, "Laser-Induced Damage of Optical Materials," Institute of Physics Publishing, Bristol & Philadelphia (2003), which is incorporated herein by reference.

We claim:

1. A multi-transverse-mode optical fiber comprising:
   a core region, the axial cross-section of said core region having a transverse refractive index profile,
   a cladding region adjacent said core region,
   said core and cladding regions configured to support multiple transverse modes of optical signal radiation within said core region,
   said fiber including a first axial segment in which said profile is not radially uniform being characterized by a radial dip in refractive index, said first segment supporting more than one of said transverse modes,
   said fiber having a second axial segment optically coupled to said first segment, said profile of said second segment being more uniform than that of said first segment, and said segments being adiabatically coupled to one another.

2. The fiber of claim 1, wherein said first segment is characterized by a parameter $M_1^2$ and said second segment is characterized by a parameter $M_2^2$, where $M^2$ defines the similarity that the fundamental transverse mode of said fiber has to an ideal Gaussian function, and wherein $M_1^2 > 1.0$ and $M_2^2 << M_1^2$.

3. The fiber of claim 2, wherein $M_1^2 >> 1.0$ and $M_2^2 \sim 1.0$.

4. The fiber of claim 1, wherein said first segment comprises a major portion of the length of said fiber, and said second segment comprises a terminal portion of said fiber.

5. The fiber of claim 4, wherein said fiber includes a third axial segment optically coupled to said first segment, said profile of said third segment being more uniform than that of said first segment and being adiabatically coupled to said first segment, said second segment being located at one end of said first segment and said third segment being located at the opposite end of said first segment.

6. The fiber of claim 1, wherein said profile of said core region exhibits a dip in refractive index of $\Delta n_d$, which is approximately 5-100% of the difference $\Delta n$ in transverse refractive index between said core region and said cladding region.

7. The fiber of claim 1, wherein fiber is configured to propagate said signal radiation in the fundamental transverse mode.

8. The fiber of claim 1, wherein said first segment comprises a major portion of the length of said fiber, and said second segment comprises an intermediate portion of said fiber.

9. The fiber of claim 1, wherein said core and cladding regions are configured to form a large mode area fiber.

10. The fiber of claim 9, wherein said large mode area fiber comprises a gain-producing fiber.

11. The fiber of claim 9, wherein said large mode area fiber comprises a pigtail fiber.

12. An optical fiber apparatus comprising
    an optical fiber according to claim 10 for amplifying said signal radiation in response to optical pump energy applied thereto, and
    an optical fiber stub coupled to one end of said fiber and configured to diffract radiation propagating in said stub.

13. The apparatus of claim 12, wherein said stub comprises a core-less fiber.

14. The apparatus of claim 12, wherein the refractive index of said stub is essentially uniform within any axial cross-section of said stub.

15. The apparatus of claim 14, wherein the refractive index of said stub is essentially uniform from one axial cross section of said stub to another.

16. An optical amplifier comprising:
    an optical fiber according to claim 10 for amplifying said signal radiation in response to optical pump energy applied thereto,
    a source of said pump energy, and
    a coupler for coupling said pump energy and said optical signal into said optical fiber.

17. The amplifier of claim 16, wherein said optical signal has a first center wavelength and said source of pump energy comprises a semiconductor light source for generating an optical pump signal having a second center wavelength.

18. A high power optical amplifier comprising:
    a multi-transverse-mode, large-mode-area hybrid optical fiber including
        a core region doped with at least one gain-producing species, the axial cross-section of said core region having a transverse refractive index profile, said core region configured to amplify an optical input signal propagating therein in response to optical pump energy applied thereto, a cladding region adjacent said core region, said core and cladding regions configured to support multiple transverse modes of optical radiation within said core region, said fiber including a first axial segment in which said profile is not radially uniform being characterized by a radial dip in refractive index, said first segment supporting more than one of said transverse modes, said fiber having a second axial segment optically coupled to said first segment, said profile of said second segment being more uniform than that of said first segment, said segments being adiabatically coupled to one another so that energy propagating in particular transverse mode in said first segment is not significantly coupled into other transverse modes in said second segment; and said first segment being characterized by a parameter $M_1^2$ and said second segment being characterized by a parameter $M_2^2$, where $M^2$ defines the similarity that the fundamental transverse mode of said fiber has to an ideal Gaussian function, and wherein $M_1^2 > 1.0$ and $M_2^2 \ll M_1^2$, said second segment being located at either an input end of said first segment, at an output end of said first segment, or both, a LED for generating said optical pump energy at a center wavelength different from that of said optical signal, and a pump combiner for coupling said pump energy into said fiber.

19. The amplifier of claim 18, wherein $M_1^2 \gg 1.0$ and $M_2^2 \sim 1.0$.

20. The amplifier of claim 18, wherein said profile of said core region exhibits a dip in refractive index of $\Delta n_d$, which is approximately 5-100% of the difference $\Delta n$ in transverse refractive index between said core region and said cladding region.

21. The amplifier of claim 18, further including an optical fiber stub coupled to one end of said fiber and configured to diffract radiation propagating in said stub.

22. The apparatus of claim 21, wherein said stub comprises a core-less fiber.

23. The apparatus of claim 21, wherein the refractive index of said stub is essentially uniform within any axial cross-section of said stub.

24. The apparatus of claim 23, wherein the refractive index of said stub is essentially uniform from one axial cross-section of said stub to another.

25. A multi-transverse-mode optical fiber comprising:

first and second fiber segments, each segment having a core region and a cladding region adjacent said core region, the axial cross-section of each of said core regions having a transverse refractive index profile, said core and cladding regions configured to support multiple transverse modes of optical signal radiation within said core regions, said profile within said first axial segment not being radially uniform and being characterized by a radial dip in refractive index, said first segment supporting more than one of said transverse modes, said second axial segment optically coupled to said first segment, said profile of said second segment being more uniform than that of said first segment, and said segments being adiabatically coupled to one another.

26. The fiber of claim 25, wherein said optical fiber comprises a gain-producing fiber.

27. The fiber of claim 25, wherein said optical fiber comprises a pigtail fiber.

28. An optical fiber apparatus comprising an optical fiber according to claim 26 for amplifying said signal radiation in response to optical pump energy applied thereto, and an optical fiber stub coupled to one end of said fiber and configured to diffract radiation propagating in said stub.

29. The apparatus of claim 28, wherein said stub comprises a core-less fiber.

30. The apparatus of claim 28, wherein the refractive index of said stub is essentially uniform within any axial cross-section of said stub.

31. The apparatus of claim 30, wherein the refractive index of said stub is essentially uniform from one axial cross-section of said stub to another.

32. The fiber of claim 25, further including a third segment axially disposed between said first and second segments, said third segment being configured to adiabatically couple said first and second segments to one another.

33. The fiber of claim 32, wherein said third segment does not exhibit optical gain.

34. The fiber of claim 33, wherein said first and second segments are gain-producing fibers and said third segment is not.

* * * * *